July 12, 1932.  A. HERZ  1,867,151

FUSED CUT-OUT

Filed June 7, 1923  5 Sheets-Sheet 1

July 12, 1932.　　　A. HERZ　　　1,867,151
FUSED CUT-OUT
Filed June 7, 1923　　5 Sheets-Sheet 2

Witnesses:
W. F. Kilroy
Harry R. C. White

Inventor:
Alfred Herz
By Brown Boettcher Dienner
Attys

July 12, 1932.  A. HERZ  1,867,151
FUSED CUT-OUT
Filed June 7, 1923  5 Sheets-Sheet 3
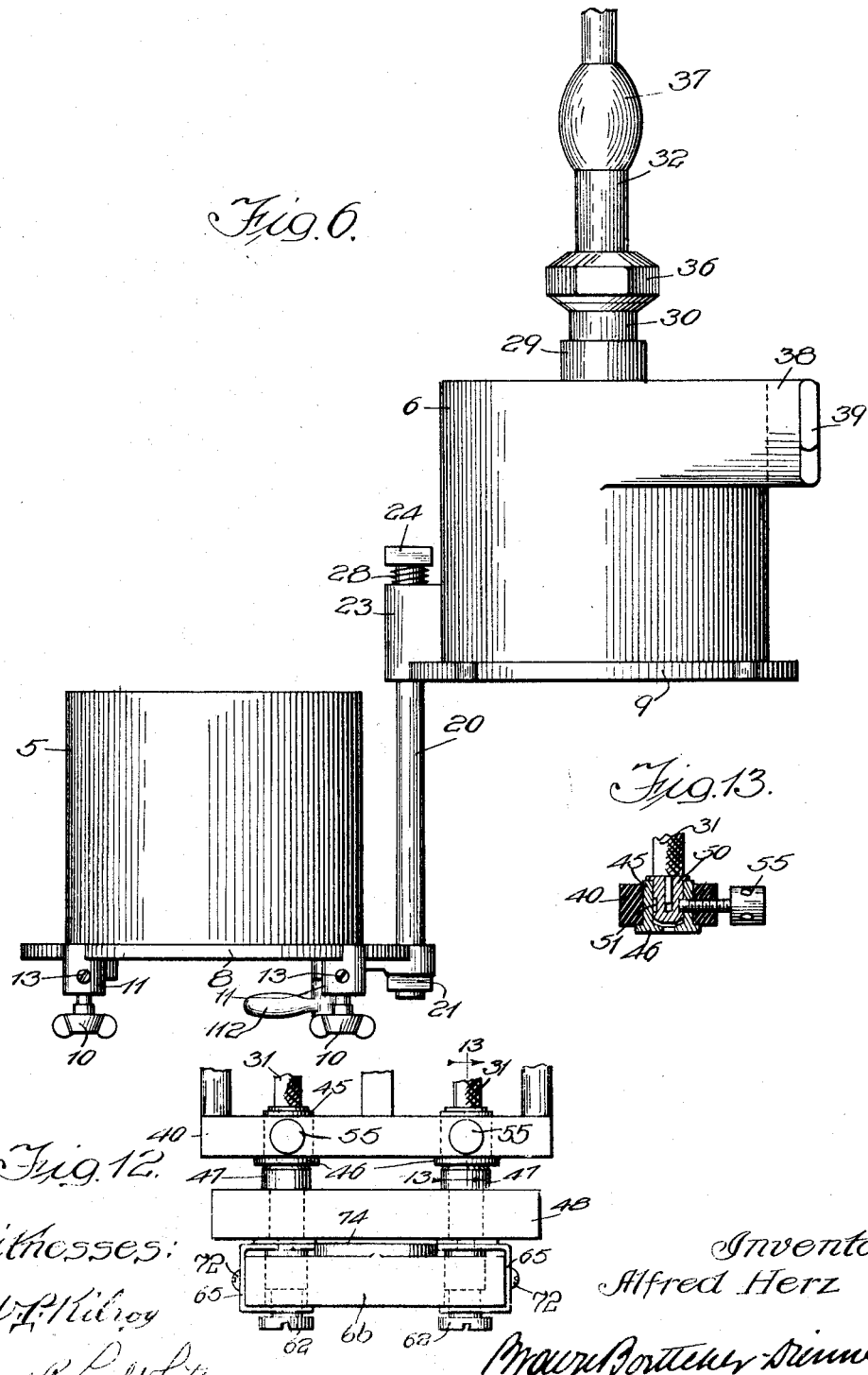

July 12, 1932.                    A. HERZ                    1,867,151
                                FUSED CUT-OUT
                  Filed June 7, 1923        5 Sheets-Sheet 4
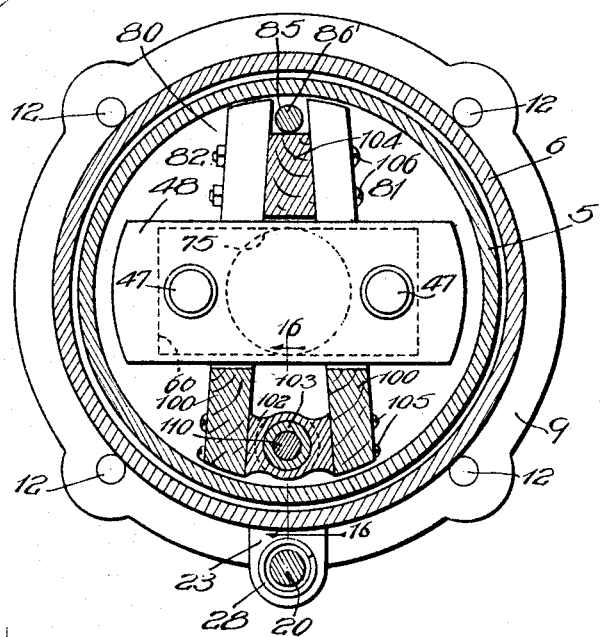
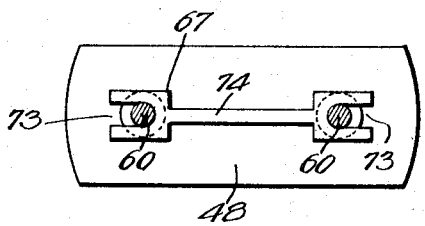
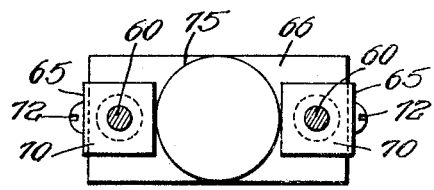
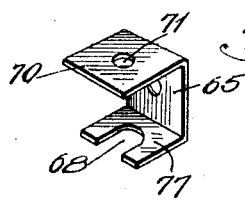
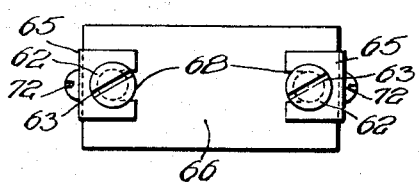
Witnesses:                                          Inventor:
                                                    Alfred Herz July 12, 1932. A. HERZ 1,867,151
FUSED CUT-OUT
Filed June 7, 1923 5 Sheets-Sheet 5
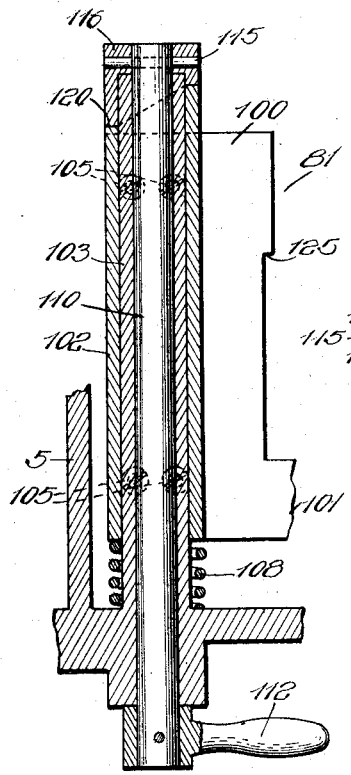
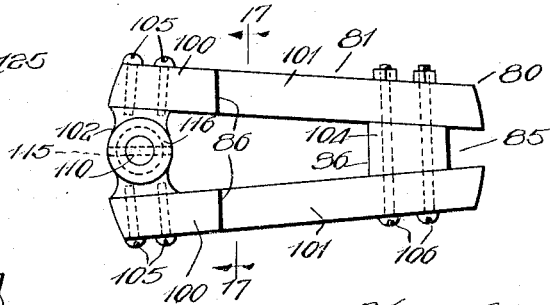
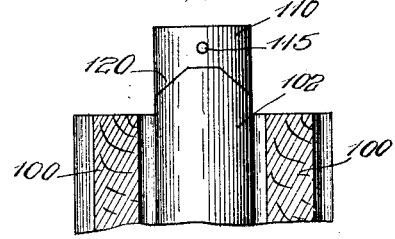
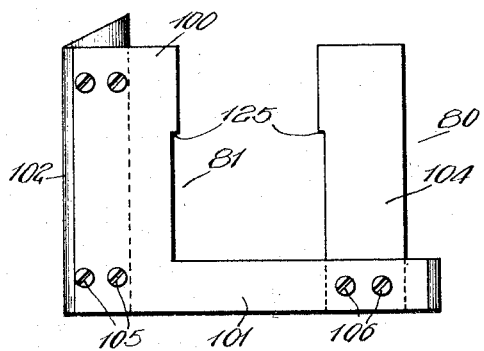
Witnesses:
W. F. Kilroy
Harry R. L. White
Inventor:
Alfred Herz
Brown, Boettcher & Dienner
Attys.

Patented July 12, 1932

1,867,151

UNITED STATES PATENT OFFICE

ALFRED HERZ, OF CHICAGO, ILLINOIS, ASSIGNOR OF ONE-HALF TO EDMUND O. SCHWEITZER, OF CHICAGO, ILLINOIS

FUSED CUT-OUT

Application filed June 7, 1923. Serial No. 643,854.

My invention relates to electrical circuit protective apparatus.

While the particular device which I shall describe hereinafter, in connection with the drawings, is a circuit protective device of the type generally designated as a cut-out, and is further characterized by the use of a fusible link for opening a circuit under overload, it is to be understood that the invention is not limited to the particular embodiment shown, but may be employed in all similar work.

It has been found that the use of compression blocks on the sides of the fusible link of such devices has greatly increased the efficiency and positiveness of operation, this particular feature being shown in prior Patent No. 1,144,732, granted June 29, 1915, to Edmund O. Schweitzer and myself. It has been further found that the submergence of the compression blocks and the fuse in oil greatly increases the range of operativeness and usefulness of such devices, this feature being shown in my prior Patent No. 1,222,952 granted April 17, 1917, and still further, that the use of a closed container capable of withstanding a very considerable pressure is highly useful, this last feature being shown in my prior Patent 1,380,556 granted June 7, 1921.

One problem with which I am now concerned is that of preventing the entrance or ingress of moisture into the container of devices of this sort. While the entrance of moisture will damage the insulation, decrease the efficiency of the device and tend to break down the same, the tightness of the joint between the tank and cover or other container parts has heretofore been relied on to prevent the entrance of moisture into the device.

My present invention provides novel means for more positively excluding moisture than has been done heretofore, and incidentally, a container of novel construction for retaining considerable pressure.

According to this aspect of my invention, I employ the principle of the diving-bell for establishing pressure resistance to the ingress of moisture into the container to exclude moisture therefrom. In the embodiment shown this means excludes from the interior of the container any moisture that finds its way through the joint between the container parts. Specifically, the container comprises a bath holding and terminal or contact receiving part having an upright wall which excludes particles of moisture from the interior of the container and forms with the surrounding wall of an inverted shell clamped thereto an annular or surrounding chamber through which the moisture is prevented from rising, by the pressure within the container as in a diving-bell.

Another important aspect of my invention is the provision of means controllable from without the casing for controlling the circuit within the casing, which means adapts the device for the performance of a switching function in addition to its circuit protective function and at the same time is operable to permit the fusible link to be put in place, but not connected across the line while the cover is being secured or the container parts clamped together.

Another feature is the provision of novel air and moisture tight inlets through which the conductors are lead into the device.

Another feature is the provision of an improved connection permitting relative longitudinal and pivotal movement between the container parts for facilitating access into and closing of the container.

Another feature is the provision of novel means for clamping the container parts together and preventing displacement of the clamping means.

Another feature is improved supporting and insulating means for the stationary contacts which will facilitate free access of the oil or other insulating liquid in the container to the contact mechanism, and which will, at the same time, prevent electric flash over between the contacts.

Incidently I have made a number of improvements in the mechanical construction of the device which will be apparent from the following detail description. These relate to the structures for accomplishing the foregoing provisions, to improved mounting and guiding provisions for the insulated contact and fuse supporting means and to the formation of the supporting cradle.

To apprise those skilled in the art with the construction and operation of my invention, I shall now describe a specific embodiment of the invention in connection with the accompanying drawings which form a part of the present specification.

In the drawings:—

Fig. 6 is an elevational view showing the tank or lower shell let down and swung out from under the upper inverted shell or cover;

Fig. 7 is a horizontal sectional view taken on line 7—7 of Fig. 2, just below the stationary contact carrying block and above the upper fuse or compression block;

Fig. 8 is a horizontal section on line 8—8 of Fig. 2 showing the fusible link and the lower side of the upper compression block in elevation;

Fig. 9 is a plan view of the lower compression block and contacts as taken on line 9—9 of Fig. 2;

Fig. 10 is a bottom plan view of the lower compression block and contacts;

Fig. 11 is an isometric view of one of the straps for making contact with the fusible link and retaining the contact nuts in place;

Fig. 12 is a side elevational view of the compression block and upper contact carrying block;

Fig. 13 is a transverse section through the upper or stationary contact carrying block on line 13—13 of Fig. 12.

Fig. 14 is a side elevational view of the cradle or support.

Fig. 15 is a top plane view of same.

Fig. 16 is an enlarged vertical section on line 16—16 of Fig. 7 showing the container fragmentarily and the means controllable from outside the container for controlling the circuit therein, and Fig. 17 is a fragmentary section on line 17—17 of Fig. 15.

Figure 5:
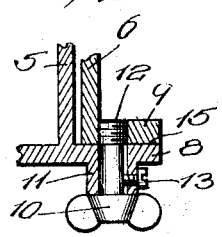
Fig. 5 is a fragmentary detail section on line 5—5 of Fig. 1 showing the manner of clamping the container parts together.

Referring to the drawings, the container, as already pointed out, employs the principle of the diving-bell for excluding moisture from the interior thereof. Said container comprises a vessel 5 having an annular wall extending up within an inverted shell or cover 6. Shell 5 is closed at its bottom and open at its top, and cover 6 has a closed top and open bottom. These shells or container parts 5 and 6 are preferably fashioned to secure light weight and great strength. At its lower edge, shell or vessel 5 has an outwardly extending annular flange 8, and cover or shell 6 has a cooperating annular flange 9. The two shells or parts are clamped together by wing or thumb bolts 10 mounted in tubular bosses 11 formed integral with and depending from the bottom of flange 8. The shanks of bolts 10 are enlarged or headed at their upper ends as shown at 12 (Fig. 5), and said enlarged or headed ends are threaded to be screwed into threaded holes in flange 9. Below threaded heads 12 the shanks of bolts 10 are reduced. Set screws 13 threaded radially through bosses 11 project into the annular spaces surrounding the reduced portions of bolts 10, and by cooperating with heads 12 when said heads are screwed or threaded out of engagement with flange 9 hold bolts 10 against displacement from flange 8. Four bolts 10 are shown, but it is of course to be understood that more or less may be employed.

The upright wall of vessel 5 receives the cut-out mechanism and is adapted to hold a body or bath of liquid such as transformer or other suitable insulating oil, or an arc extinguishing and insulating liquid, such as carbon tetrachloride, or a liquid such as disclosed in U. S. Patent No. 1,319,907, granted October 28, 1919, to Edmund O. Schweitzer and Nicholas J. Conrad. Any ingress of moisture that finds its way through joint 15 between flanges 8 and 9, which joint may be suitably packed if desired, is excluded from the interior of shell 5 by the upright wall thereof, and this wall forms with the depending wall of shell 6 a surrounding space 26 through which moisture is prevented from rising if it accumulates in the bottom of said space, as in a diving-bell, by the pressure within the container. The pressure in space 26 and in vessel 5 with which it communicates over the upper edge of wall 5 thus prevents water from rising up through space 26 and thereby excludes its entrance into shell 5 up through said space 26.

The embodiment of this principle to exclude water and moisture from the cut-out mechanism of a device of this sort is especially advantageous where the device is to be used for underground and subway work, where moisture is especially prevalent.

At the front of the container, flange 8 has a threaded hole. The lower threaded end of a relatively long bolt or rod 20 is screwed through this hole and into a nut 21, which securely locks the rod or bolt 20 in place. From flange 8 bolt 20 extends upwardly through an opening 22 in an integral lug or boss 23 projecting radially from upper shell or cover 6. Bolt 20, the upper end of which has a head or enlargement 24, permits vessel 5 to be dropped upon screwing bolts 10 out of engagement with flange 9, to a point at which the upper edge of vessel 5 clears the lower edge of inverted shell or cover 6, whereupon vessel 5 may be swung or rotated about the axis of bolt 20 into the position shown in Fig. 6, where the interior is exposed to view and for access without mechanically disconnecting the tank or vessel 5 from shell or cover 6 and without removing bolts 10 from flange 8. A helical spring 28 held above lug or boss 23 and surrounding rod or bolt 20 engages head 24 as vessel 5 nears the lower limit of its movement to yieldably support vessel 5 in said position. This spring 28 yieldingly limits relative longitudinal movement between the casing parts and serves as a cushion or bumper to prevent cracking or breaking of the parts by dropping or too quick downward movement of vessel 5.

Cover 6 has a pair of integral bosses 29 internally threaded to receive suitable nipples 30 screwed into said bosses and preferably welded in place as at 30'. Through nipples 30 insulated conductors 31 are led to contacts within vessel 5. The conductors 31 leading into the cut-out are in this case lead covered cables introduced through wiping sleeves 32 for making tight joints with the cable sheaths 33 at their outer ends and with nipples 30 at their inner ends. The inner ends of sleeves 32 have flanges 34, and said inner flanged ends 34 are clamped to the outer ends of nipples 30 by suitable nuts 36 having threaded engagement with the outer ends of nipples 30. Suitable gaskets or washers 35 clamped between nipples 30 and sleeves 32 provide tight joints therebetween. Cable sheaths 33 are removed or peeled back from the inner ends of conductors 31 and tight joints are provided between said cable sheaths 33 and the outer ends of wiping sleeves 32 by wiped solder joints 37, such as are well known in the art.

The foregoing inlet structures for conductors 31 effectively prevent the ingress of moisture to the cut-out within the container through the inlets through which conductors 31 are led in. This is especially important along with the employment of the diving-bell principle for excluding leakage through joint 15 where the cut-out is to be used for underground and subway work, where, as already pointed out, moisture is especially prevalent.

The mounting of nuts 36 on wiping sleeves 32 instead of on nipples 30 as usual in such fittings heretofore, permits convenient removal and replacement of said nuts 36 in event same become cracked or broken. When the nut is mounted on nipple 30 and said nipple is an integral part of the container, removal and replacement of the nut is impossible.

Mounting arms 38 formed integral with cover 6 and projecting rearwardly therefrom are formed with lugs 39, holes or other suitable means for fastening or attaching the cut-out to a cross arm, pole, wall or other suitable support.

Figure 1:
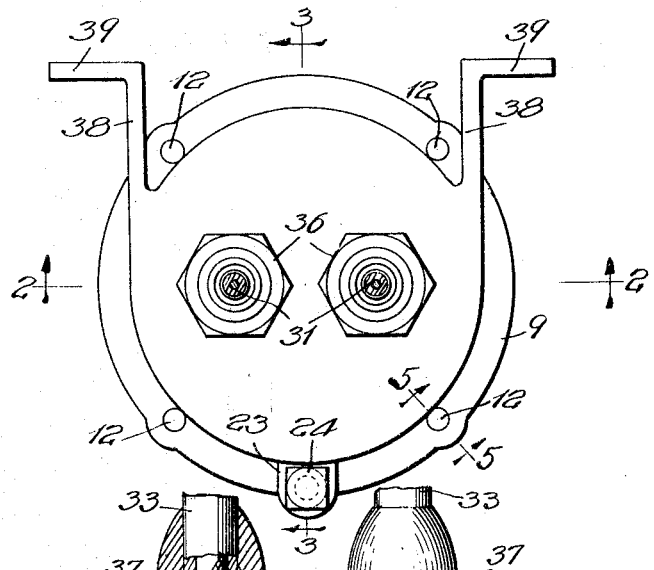
Fig. 1 is a top plan view.
Figure 2:
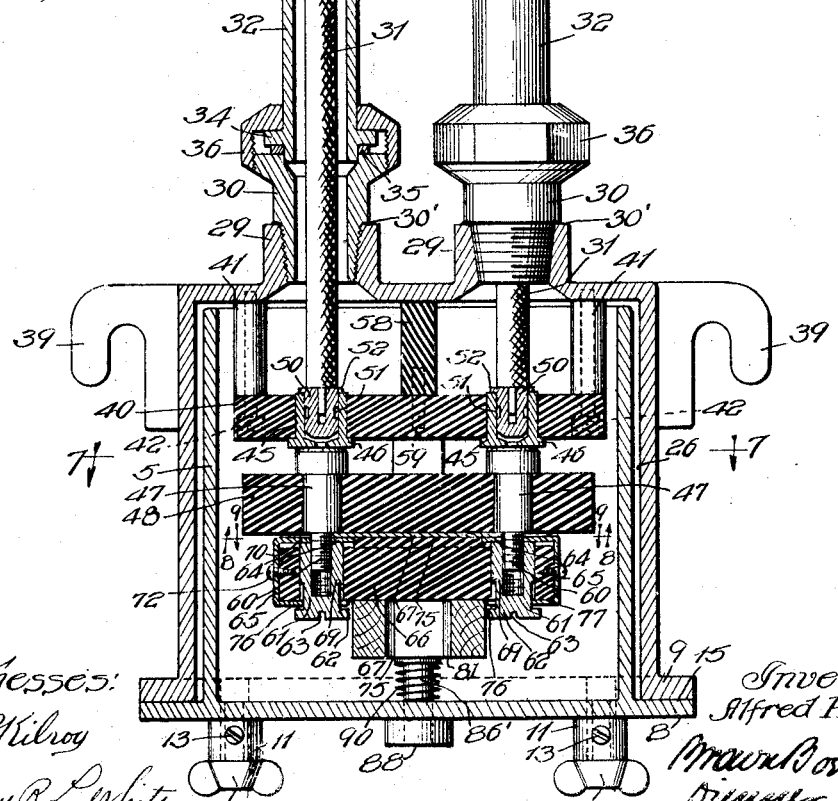
Fig. 2 is a vertical sectional view on line 2—2 of Fig. 1.

A block of insulation 40, of bakelite or other suitable or preferred insulating material, is secured within shell or cover 6 to the lower side of the closed top thereof by means of fillers or posts 41 of bakelite or other suitable insulation, and screws 42 having their heads countersunk into the lower side of block 40 and extending up through posts 41 and threaded into the closed top of cover 6 (Fig. 2). Block or table 40 supports two stationary contacts 45 which comprise metallic sockets mounted in openings in block 40 in axial alignment with the inlets through tubular bosses 29. The lower ends of contacts 45 terminate in flanges or heads 46 which engage the under side of block 40 and provide flat heads for butt or end to end engagement with contacts 47 of the upper fuse or compression block 48.

Figure 4:
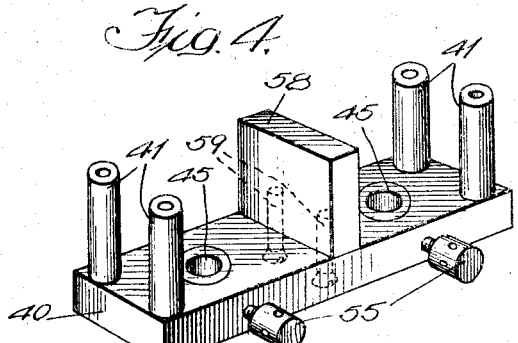
Fig. 4 is an isometric view of the stationary contact carrying block showing the insulating barrier mounting posts, socket contacts and capstan screws associated therewith.

Suitable holes or openings through heads 46 of contacts 45 prevent accumulation of foreign particles within the internal sockets of said contacts 45. Contacts 50 soldered or otherwise secured as by means of suitable internal sockets upon the ends of conductors 31, the insulation of said conductors being peeled back or removed sufficiently for that purpose, engage in the internal socket portion of contacts 45, and are provided about their peripheries with annular grooves 51. The upper ends of contacts 50 are flanged or headed at 52 for engagement with the upper ends of contacts 45. Suitable capstan screws 55 threaded through block 40 (Figs 4, 12 and 13), and engaging at their inner ends in grooves 51, hold contacts 50 securely in the socket portions of contacts 45 and in proper electrical engagement therewith, and at the same time hold contacts 45 in the openings in block 40. Screws 55 may be conveniently turned by means of the usual rod or pin from the bottom of shell 6 when the shell 5 is dropped and swung into the position shown in Fig. 6. Contacts 45, 47 and 50 are formed of brass or other suitable metal having good conducting and wearing qualities.

From the foregoing it will be apparent that contacts 50 are readily removable from contacts 45 which make butt contact with contacts 47, and that the same screws that hold contact sockets 45 in block 40 removably secure contacts 50 in said contacts 45.

A transverse partition 58 also of bakelite or other suitable insulating material, as explained in connection with block 40, mounted in upright position upon upper surface of block 40 by screws 59 and extending up to the under surface of the top of cover or shell 6 between the contacts associated with block 40 provides an insulating barrier between said contacts and the ends of conductors 31. This barrier 58 mechanically strengthens block 40 and prevents electric splashing or flash overs between the ends of conductors 31 and the contacts associated therewith. The fillers or posts 41 position block 40 without interfering with ready and free access of the oil or other insulating liquid in the container to the contact mechanism.

Contacts 47 are enlarged or headed at their upper ends for engagement with the upper side of block 48. Below said headed or enlarged ends the shanks of contacts 47 extending through openings or holes in block 48 are reduced, and said reduced shanks terminate at their lower ends in further reduced threaded portions 60, which threaded portions 60 are engaged by suitable cylindrical nuts 61 having flat heads 62 provided with screw driver slots 63. The inner ends of tubular nuts 61 are cut off square at 64 (Fig. 2) to engage straps 65 which while preferably of bronze, may be of brass, copper or other metal having proper conductivity. These straps extend around the ends of lower compression block 66 for the dual purpose of making good contact with the ends of fusible link 67 and for retaining cylindrical nuts 61 from displacement from block 66. The outer leg of each strap 65 is slotted at 68 (Fig. 11), so that the reduced portion of tubular nut 61 may be gripped in said slot, shoulder portion 69 of nut 61 preventing the escape of the nut through the slot. The inner legs 70 of straps 65, which inner legs make contact with the ends of fusible link 67 have openings or holes 71 through which the reduced threaded contact ends 60 extend. Straps 65 are held in place on the ends of the lower compression or fuse block 66 by means of small wood screws 72. The shoulders 69 on tubular nuts 61 engage the walls of slots 68 when the nuts are loosened from the reduced threaded ends 60 of contact pins or posts 47, so that the tubular nuts cannot be lost from block 66.

The outer enlarged ends of fusible link 67 have slots 73 which engage around reduced threaded portions 60 of contacts 47. Between said enlarged ends, fusible link 67 has a reduced or restricted portion 74 (Fig. 8), to which the blowing or fusing is usually confined. Block 66 has a circular boss 75 projecting slightly from the upper surface thereof, and it is between said boss 75 and block 48 that reduced or restricted portion 74 of fuse link 67 is clamped. Compression block 66 is not gripped by the heads 62 of nuts 61, a small space 76 (Fig. 2) being left between the heads 62 of each nut, and the adjacent leg 77 of strap 65. The heads 62, however, limit the outward movement of block 66 so that only a predetermined amount of movement of said block is possible when the fuse 67 blows.

Figure 3:
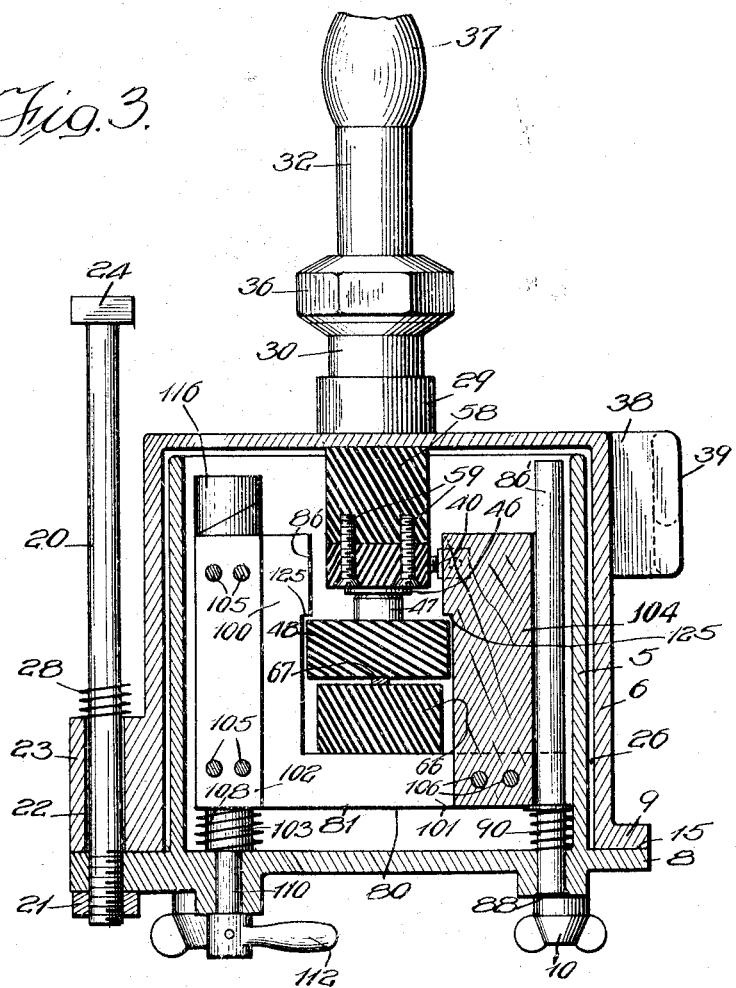
Fig. 3 is a similar section taken at right angles on line 3—3 of Fig. 1.

Compression blocks 48 and 66 are held against fuse 67 by the mounting in which said blocks are normally supported. This mounting comprises a U-shaped cradle 80. This cradle, which may be made of wood, comprises a pair of L-shaped blocks or members 81 having upright legs 100 and horizontal legs 101. An upright tubular member 102 which may be made in the form of a casting is mounted between upright legs 100 being secured in the embodiment shown by screws 105 to flat mounting faces formed integral with tubular member 102. An upright tube or stand-pipe 103 formed integral with the bottom of shell 5 extends up through tube 102 and forms a guide for one side of the cradle. The horizontal legs of members 81 converge toward the opposite side of the cradle and an upright piece 104 fastened therebetween by bolts 106 forms the other upright leg of the U. Piece 104 is set in from the ends of the horizontal legs of member 81, leaving a passageway 85 through which an upright guide rod or post 86' extends. The inner edges 86 of vertical legs 100 and 104 are spaced apart to receive the block 48 and the fuse mounting. At its lower end rod or post 86' is welded through a boss depending from the bottom of vessel 5, as indicated at 88 in Figure 3. Upright tube 103 extending up through tube 102 mounted between legs 100 and post 86' extending up between the horizontal legs of the cradle and along vertical leg 104 form guides for the U-shaped cradle. Springs 108 and 90 surround the lower ends of stand-pipe 103 and rod 86' respectively and tend to raise the cradle 80, this tendency being employed to hold the compression blocks against the fuse and to hold contacts 47 against contacts 45 when the parts are in their normal position, as indicated in Figs. 2 and 3. A suitable washer may be provided about rod 86' to provide a good seating for cradle 80 upon spring 90. It is to be noted that cradle 80, in addition to holding compression blocks 48 and 66 properly in place, also serves as a guide for guiding the vessel 5 down from and up into cover 6 and over insulating block 40 and the mounting and contact mechanism associated therewith. Contacts 47 are thereby guided properly into alignment with contacts 45. As previously explained, cylindrical nuts 61 need not clamp compression blocks 48 and 66 together, as this function may be performed solely by springs 90, the heads 62 of nuts 61 serving merely to limit the outward movement of compression block 66 with respect to compression block 48. The inner ends of straps 65 have sufficient resiliency to permit slight relative movement between the compression blocks.

The means controllable from without the casing for controlling the circuit within the casing and thereby adapting the device for the performance of a switching function in addition to its circuit protective function, comprises a post or rod 110 projecting at its lower end through a boss depending from the bottom of vessel 5 and provided with an operating handle 112 for rotating or turning post 110 for a purpose to be described. Rod or post 110 extends up through stand-pipe 103 and has fixed upon its upper projecting end by a diametrical pin 115 a cap 116. The lower edge of cap 116 is inclined or finished obliquely, as indicated at 120, and engages the similarly inclined or oblique upper edge of tubular member 102. When rod or post 110 is rotated by handle 112 said rod being mounted against axial movement the lower oblique edge 120 of cap 116 fixed thereon rides over the upper oblique or inclined edge of tubular member 102 forcing said member and the entire cradle carried thereby downwardly against the tension of springs 108 and 90. In the downward movement of cradle 80 shoulders 125 along the inner edges of vertical legs 100 and 104 by engagement with compression block 48 move said block downwardly and thereby the contacts 47 out of engagement with contacts 45. In the normal position of the device as shown in Figures 2 and 3 there may or there may not be a small clearance between shoulders 125 and the upper surface of block 48.

The result of the foregoing controlling arrangement is that with the two container parts securely fastened together the contacts 47 may be moved into or out of engagement with contacts 45 as desired from without the casing. When it is desired to open the circuit shaft or post 110 is rotated to move cradle 80 downwardly and contacts 47 down out of engagement with contacts 45. To close the circut from without post 110 is rotated in the opposite direction whereupon springs 108 and 90 immediately move the cradle and compression block with their contacts 47 upwardly, these contacts being then brought into butt engagement with contacts 45. Spring 108 is preferably of greater strength than spring 90 which is provided simply to provide the proper action of the free side of the cradle. The cradle fits snugly in vessel 5 and this with the spring arrangement provided insures against tilting or disalignment.

It is desirable to be able to put the fusible link in place without actually connecting it to the terminals of the line so that the container parts may be securely fastened together before the fuse is actually connected to the line so that in case of a short circuit on the line a full arc extinguishing action of the liquid within the container will be effective. By turning post 110 to move the cradle with its compression blocks and contacts 47 to their lower position the container parts may be brought together and properly secured without engaging contacts 45 with contacts 47. Then when desired post 110 may be rotated to permit the springs to move contacts 47 upwardly into engagement with contacts 45.

The compression blocks 48 and 66 are preferably constructed substantially as set out in co-pending application, Serial No. 327,659, filed October 1, 1919, and now matured into U. S. Patent No. 1,479,558, of January 1, 1924 to Edmund O. Schweitzer and myself, of asbestos and cement board boiled in transformer oil until the oil has penetrated all parts of the blocks. As explained in that case, the blocks employed are about one inch by two inches in cross section, and boiling of same for about half an hour accomplishes thorough impregnation. The resulting product is a great improvement upon insulating materials employed for this class of service heretofore. As pointed out in that case, the treatment of boiling transformer oil apparently removes some of the objectionable minerals which are contained within the asbestos, and at the same time all of the moisture contained within the fibres of the asbestos is removed. These blocks are highly resistant to the action of heat and do not crack under uneven heating, as some of the substances as have been previously employed. The untreated board is of hygroscopic character, and sometimes contains a large moisture content, but the treatment of boiling in the transformer oil drives off all moisture and removes completely the tendency to absorb moisture.

Cradle 80 is preferably of wood, although any other suitable or preferred insulating material may be employed.

In operation, the tank or vessel 5 is lowered to position, shown in Figure 6, and filled with suitable insulating oil up to a point covering fuse 67 and the points of electrical engagement between contacts 45 and 47. The compression blocks with fuse 67 in place are then set in cradle 80 and vessel 5 is swung and raised into position and clamped to shell 6 by bolts 10. The pressures generated within the closed container rise to a high value. This effect is beneficial in extinguishing the arc of the blowing fuse. The two container parts 5 and 6 fit tightly together and the mechanical construction of the container described improves the pressure retaining ability of the container so that the sudden rise of pressure finds no easy outlet even under severe short circuit. The handle 112 is controllable from without the casing to permit convenient opening and closing of the circuit as desired and in addition to permit putting the fusible link in place without actually connecting it to the terminals of the line. A common bath serves for the switching and protective elements of the device.

I do not intend to be limited to the precise details of construction, nor to the particular embodiment of the various features shown and described.

I claim:

1. In combination, a container, cut-out means disposed within the container and having leads entering the container and connected thereto, said container comprising a bottom part having an upstanding wall, directly surrounding the cut-out means and adapted for holding a liquid bath therefor, a cover having a depending wall surrounding the upstanding wall of said bottom part and forming a space between them adapted for communication above the cut-out means within the internal space of the container which is directly exposed to said cut-out means, means for securing the bottom part and cover together, the upstanding wall of the bottom container part extending to substantially the top of the cover part to hold the insulating liquid bath at a level to substantially the top of the container and away from the joint between the container parts and the depending wall of the top part completely surrounding the upstanding wall of the bottom part.

2. In combination, a container, cut-out means disposed within the container and having leads entering the container and connected thereto, said container comprising a bottom part having an upstanding wall directly surrounding the cut-out means and adapted for holding a liquid bath therefor, a cover having a depending wall surrounding the upstanding wall of said bottom part and forming a space between them for communication with the space directly exposed to the cut-out means above the level of the liquid bath within the container, means for securing the bottom part and cover together, the upstanding wall of the bottom container part extending up to a height surrounding substantially all of the mechanism within the container to hold the insulating liquid bath at a level to substantially the top of the container and away from the joint between the container parts and the depending wall of the top part completely surrounding the upstanding wall of the bottom part.

3. In combination, a container, cut-out means disposed within the container and having leads entering the container and connected thereto, said container comprising a bottom part having an upstanding wall directly surrounding the cut-out means and adapted for holding a liquid bath therefor, a cover having a depending wall surrounding the upstanding wall of said bottom part, said bottom and cover part having cooperating flanges at the bottom of the container and means cooperating with said flanges for securing the container parts together, the upstanding wall of the bottom container part extending to substantially the top of the cover part to hold the insulating liquid bath at a level to substantially the top of the container and away from the joint between the container parts.

4. In combination, circuit contacts, a bath therefor, a container for said contacts and said bath, said container comprising a casing having a wall surrounding and exposed directly to said contacts and a flange, a shell inverted over said casing, said shell having a wall surrounding the wall of the container and forming a restricted surrounding space communicating with the interior of the container with the bath therein and a cooperating flange and means for securing the casing and inverted shell together with said flanges in cooperation, the contact surrounding wall of the container extending substantially to the top of the container surrounding shell to hold the insulating liquid bath at a level to substantially the top of the container and away from the joint between the container parts.

5. In a device of the class described, a container, a contact carrying block disposed therein and spaced marginally from the inner periphery of the container, contacts carried by said block, a bath for said contacts having free access to said contacts through the marginal spacing between said block and the inner periphery of said container, fillers between the block and container, said fillers permitting free access of said bath to said contacts, and an insulating barrier on said block between said contacts.

6. In a device of the class described, a tank, a cover for said tank, a block of insulation carried by said cover and spaced marginally from the inner periphery of the tank, a pair of stationary butt contacts carried by said block, a bath for said contacts having free access to said contacts through the marginal spacing between said block and the inner periphery of said tank, said block being spaced from said cover by fillers permitting free access of said bath to said contacts, an insulating barrier on said block between said contacts and an insulated fuse mounting having butt contacts for electrical engagement with the stationary butt contacts on the cover.

7. In combination, a container comprising two parts having cooperating flanges, bolts carried by one of said flanges and adapted for threaded engagement with the other flange to secure the container parts together, said bolts having reduced portions and set screws carried by the bolt carrying part and engageable in said reduced portions to hold the bolts against displacement upon disengagement of same from the other container part.

8. In combination, a tank and cover having telescoping cooperation, a rod connecting the tank and cover and permitting sufficient longitudinal movement therebetween to free the telescoping cooperation between the tank and cover, said rod permitting relative swinging movement between the tank and cover when they are freed so that the tank may be swung laterally from beneath the cover, means releasably securing the tank and cover together, and cushioning means carried by said rod for cushioning relative longitudinal movement between the tank and cover, said cushioning means being operable only when said tank is freed from the cover and only upon separation of the tank from the cover.

9. In combination, a container, relatively stationary contacts therein, a fuse mounting having movable contacts cooperable with said stationary contacts, a tubular guide in the casing for said fuse mounting, a post rotatably journalled in said guide, said post extending into the casing and provided externally with means for turning same in said guide, and cam means on the inner end of said post and operable upon turning the post to separate said movable contacts from said stationary contacts.

10. In combination, a casing having an upright wall, an inverted cover having a wall surrounding the wall of the casing and forming a restricted surrounding space, means for holding the casing and cover together, a pair of contacts supported within the casing, a fuse between said contacts, a pair of mechanically independent contacts carried by the inverted cover, yielding means for holding the contacts carried by the casing in electrical engagement with those carried by the cover, an insulating bath filling the casing to a point above the fuse and engaging contacts independently of the surrounding space and said space communicating with the interior of the casing above the level of the insulating bath, the upright wall of the casing extending to substantially the top of the cover to hold the insulating liquid bath about the cover contacts and cooperating casing contacts and fuse and away from the joint between the container parts and the depending wall of the top part completely surrounding the upstanding wall of the bottom part.

11. In combination, a tank, a cover for the tank, means releasably securing the cover and tank together, contacts within the tank, a pair of compression blocks, a fuse between the blocks, a cradle support for said blocks, conductors entering the tank, means connected to the terminals of the fuse and cooperating with said contacts to place the fuse in circuit with said conductors, and means controllable from outside the tank for moving the cradle and compression blocks to separate the fuse connecting means from said contact without releasing the tank from the cover.

12. In combination, a tank, a cover for the tank, contacts within the tank, a pair of compression blocks, a fuse between the blocks, a cradle support for said blocks, conductors entering the tank, means connected to the terminals of the fuse and cooperating with said contacts to place the fuse in circuit with said conductors, and means controllable from outside the tank for moving the cradle and compression blocks to separate the fuse connecting means from said contacts, said means comprising cam means on the cradle and an operating member entering the tank and having cooperating cam means.

13. In combination, a tank, a cover for the tank, contacts within the tank, a pair of compression blocks, a fuse between the blocks, a cradle support for said blocks, conductors entering the tank, means connected to the terminals of the fuse and cooperating with said contacts to place the fuse in circuit with said conductors, means controllable from outside the tank for moving the cradle and compression blocks to separate the fuse connecting means from said contact, said means comprising cam means on the cradle and an operating member entering the tank and having cooperating cam means, and spring means below the cradle for pressing the connecting means into engagement with the contacts and the cam means on the cradle into engagement with operating cam means.

14. In combination, a casing having circuit terminals, a cover for said casing, flexible yielding means for holding said terminals in closed relation and means controllable externally of the casing for separating the circuit terminals without opening the casing, said last means comprising cam means operable against said flexible yielding means in one direction to separate the circuit terminals and operable in the other direction to release said flexible yielding means and permit said yielding means to close the circuit.

15. In combination, a tank, a cover for the tank, an insulating member carried by the cover, a pair of first socketed contacts in said insulating member, conductors entering the tank and having contacts detachably engaged in the sockets in said first contacts, and means in the insulating member for securing said first contacts therein and engageable with and disengageable from said second contacts to secure said second contacts in said first contacts and to release same therefrom.

16. In combination, a tank, a cover for the tank, an insulating member carried by the cover, a pair of first socketed contacts in said insulating member, conductors entering the tank and having contacts detachably engaged in the sockets in said first contacts, and means in the insulating member for securing said first contacts therein and engageable with and disengageable from said second contacts to secure said second contacts in said first contacts and to release same therefrom, said means comprising screws passing through the socketed contacts and engageable with said second contacts.

17. In a device of the class described, the combination of a tank, a cover for said tank, an insulating member carried by said cover and spaced marginally from the inner periphery of the tank, a pair of contacts carried by said insulating member, a bath for said contacts having free access to said contacts through the marginal spacing between said insulating member and the inner periphery of said tank, the space between the insulating member and the cover being open to permit free access of the bath to said contacts, and an insulating barrier on said block between said contacts.

18. In an electric switching device of the class described, a substantially cup shaped container for receiving and for holding insulating oil, operating mechanism disposed within said oil in said container, and a substantially cup shaped container attached to said first container in inverted position annularly spaced therefrom and providing pressure within said first container for preventing ingress of moisture into the interior of said first container.

19. In an electric switching device of the class described, a vertically disposed substantially cup shaped container for receiving and for holding insulating oil, exteriorly operable contact mechanism disposed within said oil in said container, and a substantially cup shaped container removably attached to said first container in inverted position for providing pressure within said first container to prevent ingress of moisture into the interior of said first container.

In witness whereof, I hereunto subscribe my name this 2d day of June, 1923.

ALFRED HERZ.